Figure 1:
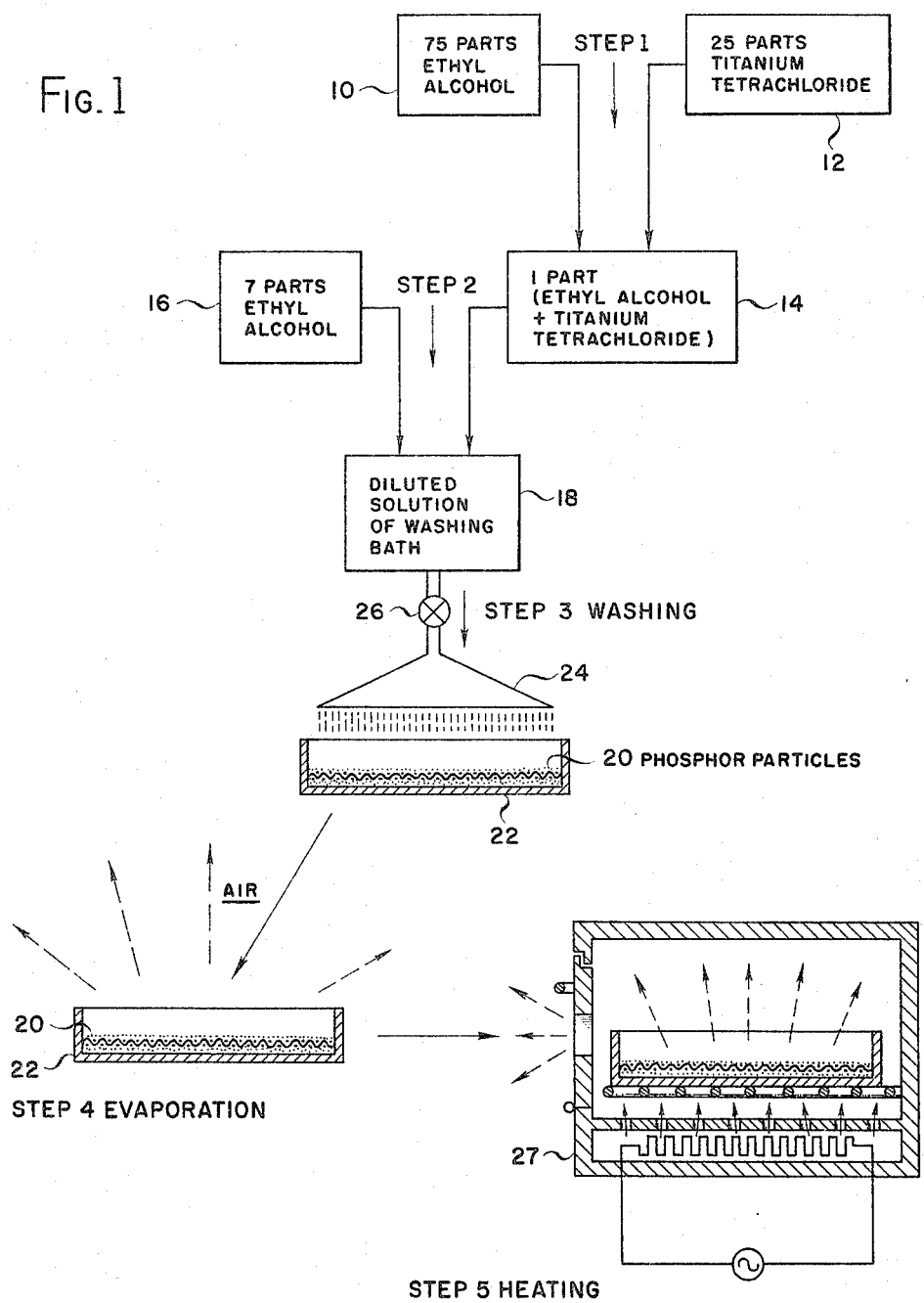

COMPARATIVE BRIGHTNESS OF COATED & UNCOATED PHOSPHORS

EMISSION SPECTRUM OF COATED & UNCOATED PHOSPHORS

INVENTOR.
WILLIAM BROOKS

United States Patent Office 3,264,133
Patented August 2, 1966

3,264,133
ELECTROLUMINESCENT PHOSPHORS AND
METHOD FOR MAKING SAME
William Brooks, Sunnyvale, Calif., assignor to Lockheed
Aircraft Corporation, Burbank, Calif.
Filed May 2, 1962, Ser. No. 191,882
15 Claims. (Cl. 117—33.5)

This invention relates generally to an electroluminescent phosphor and more particularly to a method for making an improved electroluminescent phosphor having substantially enhanced brilliance when excited.

In recent years an increased number of electroluminescent cells as circuit components have been used in display and logic apparatus. The advantages of these electroluminescent cells stem from their small size, low cost, and low power consumption as such circuit components for the apparatus. In general, these electroluminescent cells consist of finely-divided electroluminescent phosphor particles embedded in dielectric material which are positioned between spaced conductive electrodes. These electrodes can be in the form of wire mesh, such as a screen or an interlacing grid mesh or the spaced electrodes can be formed of continuous, electrically-conducting material, such as a layer of tin oxide on a glass foundation. Such electroluminescent cell constructions are well known in the prior art.

In the operation of such electroluminescent cells, a potential is applied between the spaced electrodes and the resulting electric field causes the electroluminescent phosphor particles to emit light without the generation of any large amount of heat. Many useful and efficient electroluminescent cells have been made in which the light-emitting layer is composed of phosphor particles suspended in a plastic as the dielectric medium, or is in the form of a homogeneous crystalline phosphor layer, or as a single crystal of the phosphor. Most of these forms, however, suffer to some extent from the fact that atmospheric air and humidity detract greatly from the phosphor efficiency. Thus, many prior art electroluminescent cells of the above types exhibit poor maintenance characteristics. That is to say, the brightness of the cells falls off very rapidly as the period of usage extends past a few hours. In many instances, for example, the brightness of such cells to less than one-half the initial brightness in a period as short as ten hours.

One solution to the problem of maintaining the electroluminescent cell at a high brightness level has been the proposal that the electroluminescent cells be constructed employing a phosphor which has been encapsulated in a glass globule. The glass encapsulation of the phosphor particle may be accomplished by heating to a preselected temperature a mixture of glass and phosphor as disclosed in Patent No. 2,944,177. The resulting product provides a phosphor particle which is encased in a thin film of high dielectric glass.

Another proposed solution, is that the phosphor of the electroluminescent cell be encapsulated with a colloidal silica, instead of continuous layer of glass, using any suitable coating technique. Each of the coated electroluminescent phosphor particles is then dispersed in a solid dielectric. A method by which the foregoing technique may be accomplished is disclosed in Patent No. 2,951,169

While yet another proposed solution is that the electroluminescent phosphor of the cell be encapsulated in a coating of dielectric material, such as barium titanate. The coating with barium titanate may be accomplished by heating a mixture of materials and phosphor to a suitable temperature, such as 700° C. for example, as disclosed by Patent No. 3,010,044.

Although each of the foregoing proposed solutions to the problem of maintaining high brightness in the output of an electroluminescent cell has provided a certain degree of enhancement, each of them has encountered one or more serious disadvantages. In each of the foregoing cases, it is necessary to heat the phosphor along with the associated mixture to provide the necessary coating. In so doing there arises the high likelihood that the temperature of the heating process may become too high so as to cause an adverse reaction with the phosphor. Thus, very stringent temperature controls are required in order to provide the desired end result. In addition, it has been found that the actual enhancement of brightness has been only on the order of two times the brightness of an uncoated or an unprocessed phosphor particle. Finally, it has been determined that the phosphors produced by the foregoing approach do not demonstrate a brightness characteristic which is highly dependent upon the applied voltage. The presence of a relatively high brightness to applied voltage relationship is necessary to produce a high definition phosphor which in turn provides high resolution in electroluminescent devices. Consequently, although the proposed techniques have enjoyed a limited amount of success they still do not provide the required enhancement in brightness that is on the order of 10 times the brightness versus applied voltage dependence characteristics necessary to provide high resolution in electroluminescent devices.

It is therefore an object of the invention to provide an improved method for making high brightness electroluminescent phosphors.

Another object of the invention is to provide an improved method for making a high light output phosphor by coating the phosphor with a thin transparent high dielectric film which is simple and easily applied.

Still another object of the invention is to provide an improved method employing a chemical bath and relatively low processing temperature for direct application to the phosphor particles to produce a thin film thereon.

Another object of this invention is to provide an improved phosphor where the brightness thereof changes rapidly over a narrow range of applied voltage.

Yet another object of the invention is to provide an improved phosphor particle with a thin, transparent, high-dielectric coating having enhanced light output capabilities on the order of ten times or more that of an uncoated phosphor.

The above objects are accomplished in accordance with an illustrative embodiment of the invention by a method in which a thin transparent film is deposited on phosphor particles by first washing the phosphor particles, such as zinc oxide for example, with a predominantly alcoholic bath having a halogen containing constituent, such as titanium tetrachloride for example. It should be noted that other halogen-containing constituents selected from the metallic group consisting of titanium, zirconium and hafnium may be employed to form an encapsulating coating of high dielectric material in the form of an oxide of such metal. Next permitting the phosphor to dry in air and then heating the phosphor particles for a preselected period in atmosphere which produces a coating in the form of a thin film of high dielectric material. The phosphor produced in accordance with the methods of this invention have been encapsulated in a relatively high-dielectric material, such as titanium dioxide for example, which advantageously has a dielectric constant of about 100 to 200 and readily transmits light emitted by the encased phosphor particles. In addition, the method of the present invention provides a means for expeditiously and inexpensively producing the encapsulating coating of the type desired.

More particularly, by way of example and not of limitation, the phosphor particles are washed with a solution of ethyl alcohol and titanium tetrachloride, after which the phosphor is permitted to dry in air and then the phosphor particles are heated to a temperature between 200° and 500° C. for a period of at least five minutes. Advantageously the low heating cycle of 200° to 500° insures that the phosphor is not heated to a temperature capable of causing an adverse chemical reaction to occur. Thus, the disadvantage of the prior art with regard to the high temperature exposure is avoided since the temperature range used is well below that which would cause a chemical decomposition of the phosphor particles. In addition, the present invention advantageously provides a phosphor which has an enhanced brightness characteristic which is non-linear with applied voltage in the useful excitation region of the phosphor.

Finally, the dielectric constant of the titanium dioxide is sufficiently high enough to provide high brightness, but is not too high so as to create radiation absorption problems, such as might be experienced with barium titanate and other materials as a coating which have higher dielectric constants than 200. Thus, for example, although barium titanate has a high dielectric constant, it has been discovered that the dielectric constant of this material is too high for use in relatively low voltage applications, that is, on the order of several hundred volts.

The novel features which are believed to be characteristic of the invention both as to its organization and method of operation, together with further objects, uses and advantages thereof, will be better understood from the following description considered in connection with the accompanying drawings in which an illustrative embodiment of the invention is disclosed by way of example. It is expressly understood, however, that the drawings are for purposes of illustration and description only and do not define limitations of the invention.

Figure 2:
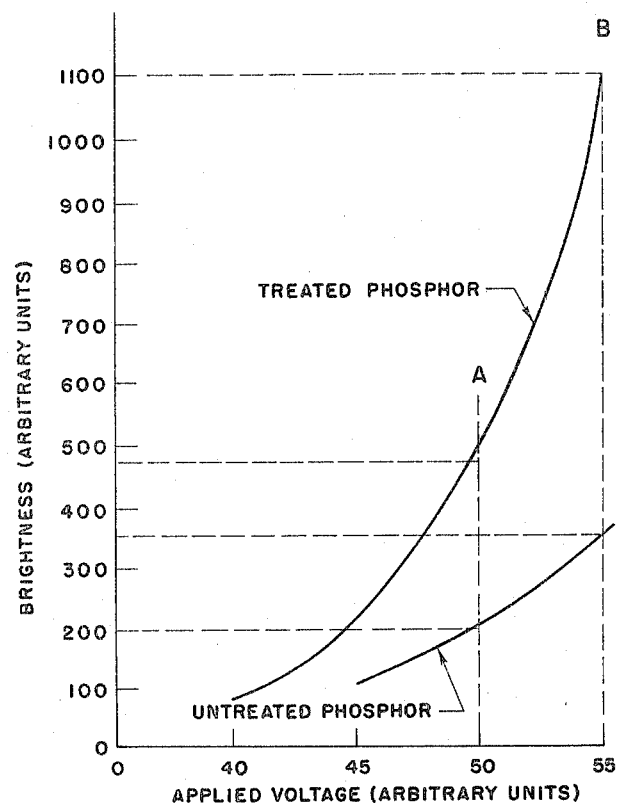
Figure 3:
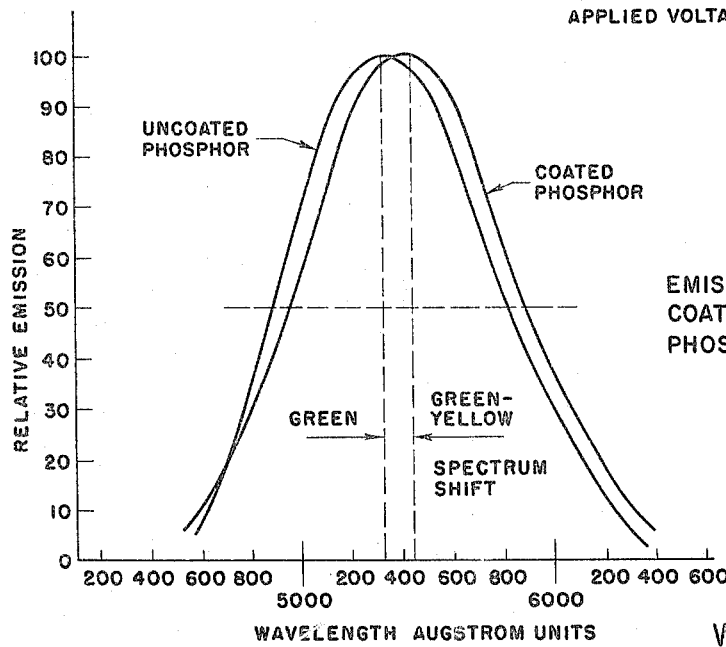

In the drawings:

FIGURE 1 is a schematic diagram which illustrates various typical steps in the method of producing the thin transparent dielectric film covering the phosphor particles, in accordance with the invention;

FIGURE 2 is a plot in arbitrary units of the brightness versus applied voltages of coated and uncoated phosphors, illustrating the enhanced output brightness of the coated phosphor, in accordance with the invention; and FIGURE 3 is a plot of relative light emission in arbitrary units versus wave lengths in angstrom units, illustrating the shift in wave length of the coated phosphor, in accordance with the invention.

With reference to the drawings, there is shown in FIGURE 1 a schematic diagram illustrating various steps in the method for coating phosphor particles with a thin transparent film of relative high dielectric material, in accordance with the invention. In the first step of FIGURE 1 a fluid 10, such as 200 proof ethyl alcohol for example, is mixed with a second fluid 12, such as titanium with a halogen containing constituent, such as tetrachloride. The fluids 10 and 12, respectively, are mixed in step 1 in the proportion of 75 parts ethyl alcohol and 25 parts titanium tetrachloride to form the third fluid 14, which is permitted to cool to room temperature before it is used in the next step of the method. In the second step one part of initially formed chemical solution 14, consisting of ethyl alcohol and titanium tetrachloride, is diluted with seven parts of ethyl alcohol, designated by reference character 16, to form a diluted solution of a washing bath 18. In this illustrative embodiment, diluted solution 18 is the final washing bath. In step 3 the diluted solution of the washing bath 18 is applied to a plurality of phosphor particles 20 which are in a suitable container 22, through the use of a suitable washing or spraying device 24. In this illustrative embodiment of the invention the phosphor to be coated may be a commercially available type commonly identified as Radio Corporation of America (RCA) 33–Z–229A (green). However, it is noted that other known phosphors selected from the group consisting of zinc sulfite, cadmium sulfite, zinc selenide, zinc sulfo-selenide, cadmium sulfo-selenide, zince cadmium sulfo-selenide and zinc oxide may be employed in place of illustrated (RCA) 33–Z–229A (green). The container 22 is selected such that no chemical reaction will occur between it and the phosphor or the bath. The rate at which the fluid 18 is applied to the phosphor particles may be controlled by a suitable valve designated 26. A sufficient quantity of the fluid 18 is applied to the phosphor particles to ensure that the particles are completely soaked. After the diluted solution 18 has been applied to the phosphor 20 the container 22 having the phosphor therein may be set aside whereupon the phosphor is permitted to dry in air by evaporation as the fourth step in the method as shown in FIGURE 1. The step of permitting the particles to dry in air is for the purpose of eliminating excess alcohol which might cause an explosion in the next step if present in sufficient quantity. After the excess alcohol has evaporated, the container with the phosphor particles therein is placed in an oven 27 as step 5 where the phosphor is subjected to an elevated temperature in the range of 200° to 500° C., for a period of approximately five minutes. The oven 27 may be any suitable oven capable of firing the phosphor at the required temperature.

Upon completion of the steps in FIGURE 1, the phosphor particles are ready for use in an electroluminescent cell. It is believed that the thin transparent coating of high-dielectric material is one of the known forms of titanium dioxide which provides the phosphor particles with an encapsulated coat having a relatively high dielectric constant of approximately 100 to 200, while the same phosphors for electroluminescent cells of the prior art have a dielectric constant which is considerably less, on the order of 10, while others have a much greater dielectric constant on the order of 2000 in the case of barium titanate. It has been found that most forms of titanium dioxide, that is, the rutile and anatase may be used in accordance with the invention. However, since rutile has apparently better electrical properties this form of titanium dioxide will preferably be used.

It will be recognized that the objects of the invention have been advantageously achieved by providing a phosphor having a coating of high dielectric constant which permits an electroluminescent cell utilizing such phosphor to operate at relatively higher applied voltages with increased light output than similar prior art electroluminescent devices. This is so since the light output of such phosphor is proportional to the applied voltage. In addition, the present method employs a heating cycle which is considerably lower in temperature than the heating cycle of the prior art methods, thereby ensuring that the phosphor is never heated to a temperature sufficient to cause it to adversely chemically decompose. Finally, the coating of the present invention tends to avoid the problems of light absorption experienced by extremely high dielectric coatings or binder materials of the prior art devices. This latter advantage arises from the fact that the phosphor has a built-in high dielectric medium, and has efficient light transmission properties. Therefore, the binder used with the phosphor of the electroluminescent device may be a low dielectric constant material. Thus, relatively little loss due to absorption by the binder or phosphor is experienced.

In order to determine the degree of enhancement of brightness of the phosphor in accordance with the present invention, an electroluminescent cell utilizing a coated phosphor, in accordance with the present invention and one utilizing an uncoated RCA phosphor were tested simultaneously under identical conditions. The brightness of the cell treated with the thin transparent dielectric material, in accordance with the present invention, greatly exceeded that of the untreated phosphor cell. FIGURE 2 is a typical plot of the comparative results of such a test. It shows the respective plots of light output versus the applied voltage for the treated and untreated phosphors. As may be seen by referring to FIGURE 2, the increased light output of the treated phosphor cell is on the order of a magnitude greater than that of the untreated phosphor.

It should be noted with particularity that the coated phosphor cell exhibits enhanced voltage dependent characteristics at the higher voltages as illustrated by the curve of FIGURE 2. More specifically, the curve may be said to illustrate a brightness proportionality which is the $n$th power of the applied voltage, where $n$ is on the order of 8. As shown in FIGURE 2 the relative brightness of the treated phosphor covers the range of 475 to 1100 units between points A and B, 50 to 55 units of the applied voltage, while the untreated phosphor indicates a brightness of 200 to 350 units over the same voltage range. Thus, it is evident that the coated phosphor exhibits enhanced brightness of more than four times that of the untreated phosphor. Still another important attribute of the phosphor is its affinity for losing brightness with slight changes in applied voltage. This rapid change in brightness is understood to be a basic reason why greater resolution may be obtained from the treated phosphor of the present invention. More particularly, the light output of phosphor having a steep brightness versus applied voltage slope as illustrated by the curve of FIGURE 2 between points A and B will disperse less than phosphor having substantially less slope, such as the curve of the untreated RCA phosphor as shown in FIGURE 2 between points A and B.

During the comparison test for these two electroluminescent cells an unexpected result was observed in connection with the cell utilizing the coated phosphor. More particularly, it was discovered that the wave-length of the light emitted by the cell had shifted from green to yellow-green. With reference to FIGURE 3, it will be noted that the shift in the peak of the emission response curve was about 100 angstrom units, from about 5,325 angstrom units to 5,425 angstrom units.

In closing, it is useful to reiterate one of the advantages of the present invention. Namely, the advantage of providing a phosphor which eliminates the necessity for using additional components, such as nonlinear resistances, to eliminate cross-talk in electroluminescent devices. Stated in another manner, whenever a particular spot of phosphor in an electroluminescent device is excited it may have associated therewith an encompassing spot of less illumination. This outer less illuminated spot is the result of dispersed light radiating from the particular excited spot. Thus, the spot will not be a sharply defined one resulting in a low definition spot. In contrast, the phosphor of the present invention is capable of producing a high definition spot since its rate of light decay as the applied voltage drops, is extremely rapid in comparison with phosphors known heretofore.

It is to be understood that the above described embodiment is only illustrative of the principles applicable in the invention. Numerous other materials and modifications of the illustrative embodiment of the method disclosed may be defined by those skilled in the art without departing from the spirit and scope of the invention. Thus, by way of example and not limitation, the titanium tetrabromide might be substituted for the titanium tetrachloride disclosed in the illustrative embodiment. An additional modification might be the use of vacuum deposition processes to deposit the high dielectric coating to the phosphor particles. It should be noted at this point, however, that such changes in chemicals or techniques of deposition may not give the identical end products, although they will be equivalent. Moreover, such changes or modifications may be more time consuming and costly. Accordingly, it is to be understood that the present invention is limited only by the spirit and scope of the appended claims.

What is claimed is:

1. A method for making high-brightness electroluminescent phosphors which comprises washing a plurality of phosphor particles with an alcoholic solution including ethyl alcohol and titanium tetrachloride, drying the washed phosphor particles in air, and heating the air-dried phosphor particles to a temperature between 200° C. and 500° C. range for at least a five minute interval to produce a thin film of titanium dioxide having high dielectric properties encasing the phosphor particle.

2. A method for making high-brightness electroluminescent phosphors which comprises initially mixing 75 parts ethyl alcohol with 25 parts titanium tetrachloride permitting said initially mixed ethyl alcohol and titanium tetrachloride to cool to a temperature about 70° C., diluting one part of said initially mixed solution of ethyl alcohol and titanium tetrachloride with 7 parts ethyl alcohol applying said diluted solution of ethyl alcohol and titanium tetrachloride to a plurality of phosphor particles in sufficient quantity to permit all surfaces of said phosphor particles to be thoroughly soaked, drying the soaked phosphor particles in air, and elevating the air-dried phosphor particles in an oven to a temperature between 200° C. and 500° C. for a period of at least 5 minutes to produce a thin film of high-dielectric material encasing the phosphor particles.

3. The method for making high-brightness phosphors defined in claim 2 in which said thin film of high-dielectric material formed on the phosphor particles is titanium dioxide.

4. A method for making high-brightness phosphors which comprises initially mixing 75 parts ethyl alcohol with 25 parts titanium tetrachloride, permitting said initially mixed ethyl alcohol and titanium tetrachloride to cool to a temperature about 70° C., diluting one part of said initially mixed solution of ethyl alcohol and titanium tetrachloride with 7 parts ethyl alcohol, applying said diluted solution of ethyl alcohol and titanium tetrachloride to a plurality of phosphor particles in sufficient quantity to permit all surfaces of said phosphor particles to be thoroughly soaked, drying the soaked phosphor particles in air, and elevating the air-dried phosphor particles in an oven to a preselected temperature range of 200° to 500° C. for a predetermined time interval of at least 5 minutes to produce a thin film of titanium dioxide encasing the phosphor particles.

5. The method forming a layer of light-transmitting high-dielectric material on phosphor particles to enhance the light output thereof which comprises mixing finely-divided phosphor particles with an alcoholic bath including ethyl alcohol and titanium tetrachloride drying the soaked phosphor particles in air, and heating the air-dried phosphor particles in air to within a temperature between 200° C. and 500° C. for a period of at least 5 minutes to produce a thin film of high-dielectric material encasing the phosphor particles.

6. A high-bright phosphor for use in an electroluminescent device comprising: a particle of phosphor capable of being excited to a luminescent state, and an encapsulating coating of high-dielectric material in the form of an oxide of metal selected from the group consisting of titanium, zirconium and hafnium for enhancing the light output of the phosphor particles.

7. The electroluminescent coated phosphor defined in claim 6 in which said high-dielectric coated material is in the form of titanium dioxide.

8. A high-brightness phosphor for use in electroluminescent devices comprising: particles of phosphor, and an encapsulating coating of high-dielectric material, in the form of titanium dioxide, said high-dielectrically coated phosphor exhibiting a light output spectrum where its relative peak light emission wave-length is greater than 5400 angstrom units in the yellow-green region of the color spectrum.

9. A high-brightness phosphor for use in electroluminescent devices comprising: particles of phosphor, and an encapsulating coating of high-dielectric material, in the form of titanium dioxide, said high-dielectrically coated phosphor exhibiting substantial voltage dependency at the upper portion of its brightness versus applied voltage response curve.

10. A phosphor exhibiting enhanced light-output and voltage dependency characteristics when subjected to relatively high applied alternating current voltages comprising: particles of phosphor selected from the group consisting of zinc sulfide, cadmium sulfide, zinc selenide, zinc sulfo-selenide, cadmium sulfo-selenide, zinc cadmium sulfo-selenide, and zinc oxide, and an encapsulating coating of high-dielectric titanium dioxide.

11. A phosphor as defined in claim 10 in which said high-dielectric titanium dioxide produces a coated phosphor which has a light spectrum where the peak light emission measured in wave-length is greater than 5,400 angstrom units in the yellow-green region of the clor spectrum.

12. A phosphor as defined in claim 10 where said high-dielectric titanium dioxide produces a coated phosphor which has pronounced voltage dependency at the upper portion of its brightness versus applied voltage response curve.

13. A method for making high-brightness electroluminescent phosphors which comprises: forming a coating from an alcohol solution of a metal halide, said metal being selected from a group consisting of titanium, zirconium, hafnium and uranium on a plurality of phosphor particles, and heating said coated phosphor particles in air to a temperature between 200° C. and 500° C. for a period of at least 5 minutes to produce a diovide said metal being selected from a group consisting of titanium, zirconium, hafnium, and uranium encasing the phosphor particles.

14. A method for making high-brightness electroluminescent phosphors defined in claim 13 in which said high-dielectric material is further defined as titanium dioxide.

15. A method for making high-brightness electroluminescent phosphors which comprises: applying a thin film of titanium tetrachloride in an alcohol solution to a plurality of phosphor particles, and heating said phosphor particles, containing the thin film of titanium tetrachloride, to a temperature between 200° C. and 500° C. for a period of at least 5 minutes to produce a thin film of titanium dioxide having high-dielectric properties encasing the phosphor particles.

References Cited by the Examiner

UNITED STATES PATENTS 2,898,229 8/1959 Herr et al.
2,992,349 7/1961 Cusano _____ 313–92

ALFRED L. LEAVITT, *Primary Examiner.*

RICHARD D. NEVIUS, *Examiner.*

R. E. ZIMMERMAN, A. H. ROSENSTEIN,
*Assistant Examiners.*